Jan. 6, 1925.
E. C. CAMERON
ATTACHMENT FOR COTTON PRESSES
Filed March 7, 1924  2 Sheets-Sheet 1
1,521,865
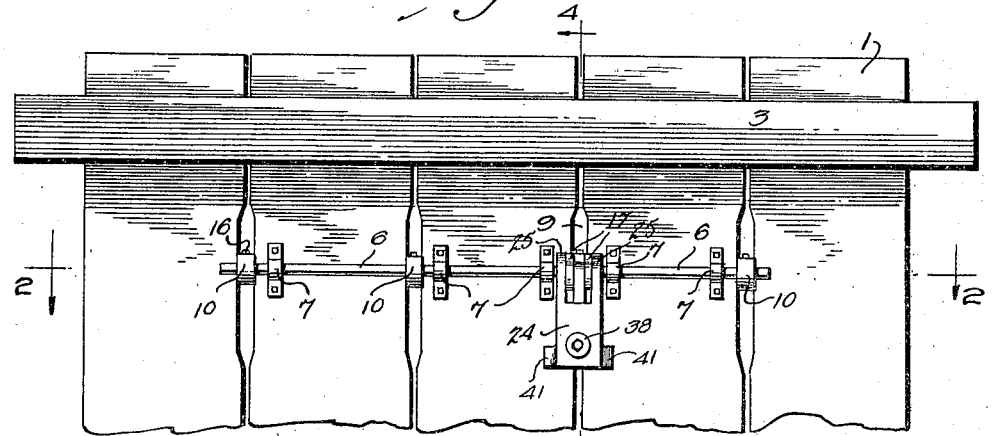
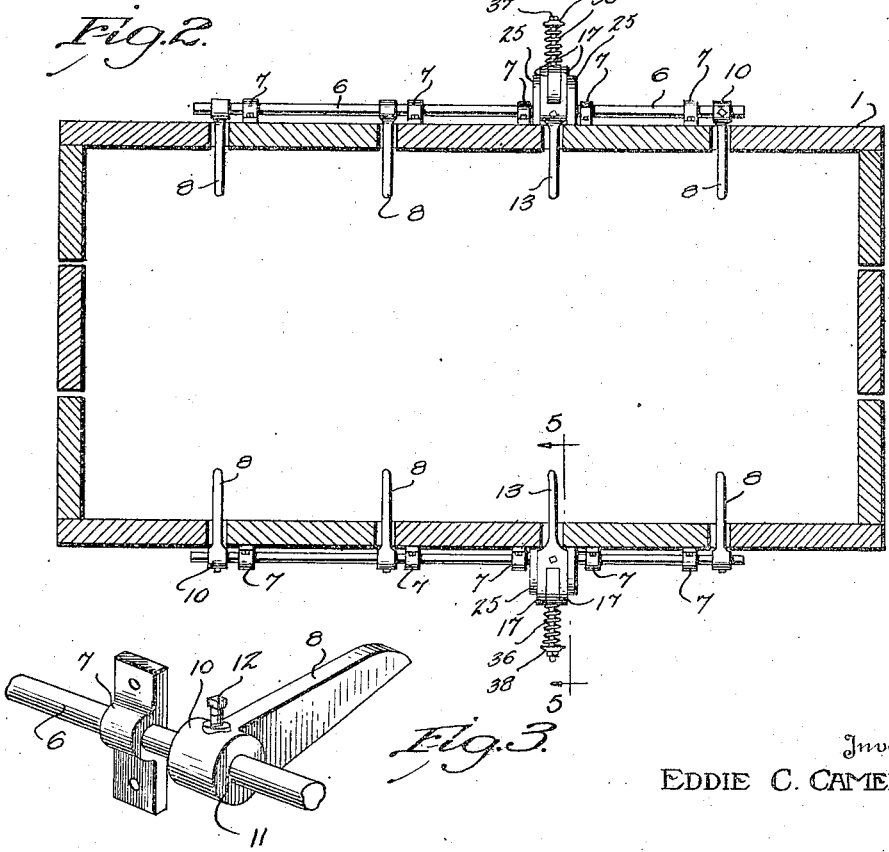
Inventor
EDDIE C. CAMERON Jan. 6, 1925. 1,521,865
E. C. CAMERON
ATTACHMENT FOR COTTON PRESSES
Filed March 7, 1924     2 Sheets-Sheet 2
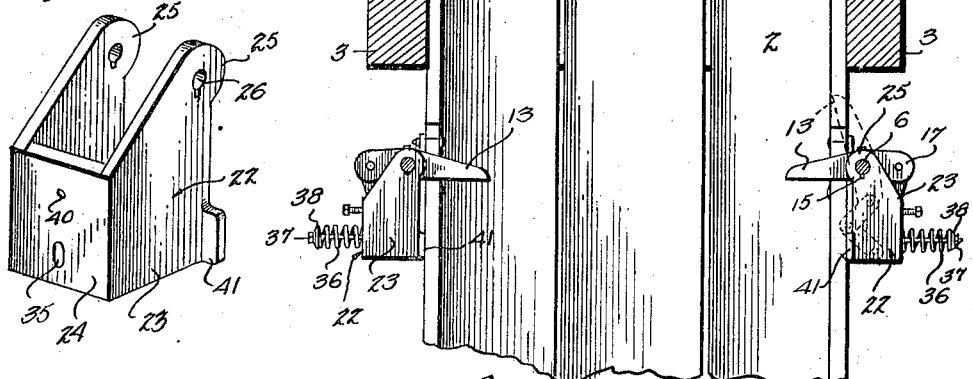
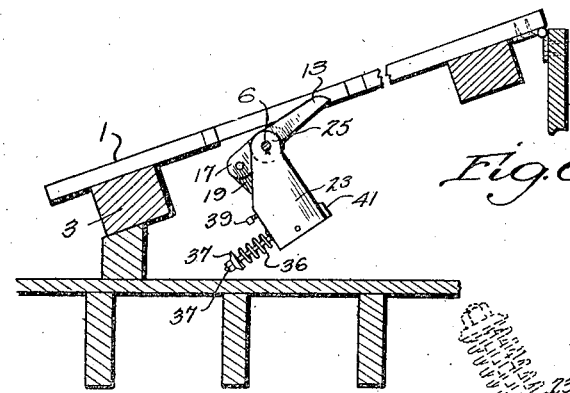
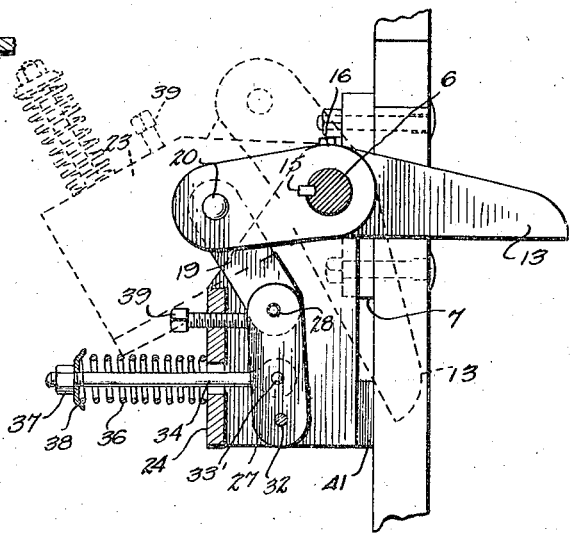
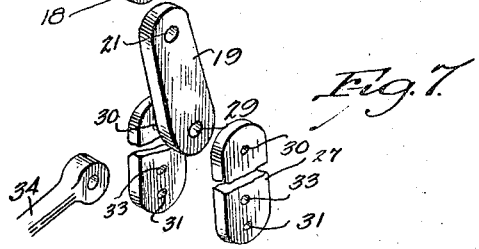
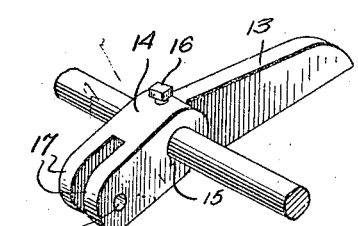
Inventor
EDDIE C. CAMERON Patented Jan. 6, 1925.

1,521,865

UNITED STATES PATENT OFFICE.

EDDIE C. CAMERON, OF HONDO, TEXAS.

ATTACHMENT FOR COTTON PRESSES.

Application filed March 7, 1924. Serial No. 697,595.

*To all whom it may concern:*

Be it known that I, EDDIE C. CAMERON, a citizen of the United States, residing at Hondo, in the county of Medina and State of Texas, have invented certain new and useful Improvements in Attachments for Cotton Presses, of which the following is a specification.

This invention relates to attachments for cotton presses, and more particularly to retainers for holding cotton in the press box while it is being ginned.

An object of the invention is the provision of a dog or retainer arranged to withstand a predetermined force and adapted to give to prevent breakage when excessive force is place on it by the operator or attendant through carelessness or in any other way.

A further object is the provision of a retainer which is normally projected to operative position by means of a weight and spring, the tension of which may be adjusted and which is adapted to open under excessive pressure to permit upward movement of the cotton in the press box. When the excessive pressure is removed, the retainers are adapted to be returned to normal position by the weight and spring.

A further object is the provision of a retainer adapted to assume an inoperative position when the press door is lowered to permit removal of a bale of cotton from the press box.

In the accompanying drawings, I have shown one embodiment of the invention. In this showing:

Figure 1 is a front elevation of a press door showing the invention applied,

Figure 2 is a horizontal sectional view through a baling press taken on line 2—2 of Figure 1, Figure 3 is a detail perspective view of one of the retaining members, Figure 4 is a vertical sectional view on line 4—4 of Figure 1, Figure 5 is a detail sectional view on line 5—5 of Figure 2, Figure 6 is a diagrammatic view of the press door in lowered position showing the position of the dog or retainer, Figure 7 is a detail perspective view of the retaining member shown in Figure 5 of the drawings, and, Figure 8 is a perspective view of a housing used in conjunction therewith.

Referring to the drawings, the reference numeral 1 designates the side walls or doors of a press box, and 2 the end walls. The side walls are supported on suitable hinges (not shown) and adapted to be lowered to the position shown in Figure 6 of the drawings, for the purpose of removing a bale from the press. As shown, the side wall consists of individual boards extending vertically and a transverse framing member 3 arranged adjacent the top. When the door is opened, the member 3 is adapted to engage a bumper 4, arranged on the floor 5 of the gin house.

A shaft 6 is mounted on the door of the press box, the shaft being supported in suitable bearings 7, secured to the door. The retaining fingers are mounted on this shaft and are keyed thereto to revolve therewith. As shown in Figure 3 of the drawings, the retaining fingers consist of body portions 8, adapted to project through slots 9 in the door. The outer ends of the fingers are provided with sleeves or bearing portions 10 through which the shaft passes. As shown, the finger may be secured to the shaft by means of a key 11, set screw 12, or other suitable members.

The automatic release mechanism for operating the retaining fingers is secured to one of the retaining fingers on each side, as shown in Figure 2 of the drawings. In place of one of the retaining fingers 8, I provide a retaining finger 13, having an enlarged portion 14 at its outer end and this enlarged portion is provided with an opening for the reception of the shaft 6. As shown in Figure 7 of the drawings, the finger may be secured to the shaft by means of a key 15, or a set screw 16, may be employed. Beyond the bearing portion, the finger is provided with a pair of ears 17, having alined openings 18. A link 19 is secured between these ears by means of a pin 20 passing through the openings 18 and an opening 21 in the end of the link. A housing 22 surrounds the outer portion of the finger. As shown, the housing consists of side walls 23 and a rear wall 24. The side walls extend upwardly above the rear wall and are provided with ears 25 at their upper ends. These ears are provided with openings 26 through which the shaft is adapted to pass. The link 19 is pivotally connected to a pair of links 27 by means of a pin 28, passing through an opening 29 in the lower end of the link 19 and through openings 30 in the upper ends of the links 27. The lower ends of the links 27 are provided with openings 31 for the reception of a pivot pin 32. Intermediate their ends, the links 27 are provided with alined openings 33, adapted to receive a pin 33' which carries an eye-bolt 34. The eye-bolt passes through an opening 35 in the rear wall of the housing. A spring 36 is arranged around the eye-bolt and the spring is retained under tension by means of a nut 37 and a washer 38. A set screw 39 is arranged in a threaded opening 40 in the wall of the housing and is adapted to engage the link 19 adjacent its connection to the link 27. Adjacent the lower end of the housing, the side walls 23 are provided with extensions 41, adapted to engage the door of the press box.

The operation of the device is as follows:

The retaining fingers 8 and 13 project into the press box and are adapted to hold the cotton being ginned in the ordinary manner. The pressure to be withstood by the fingers may be regulated by the springs 36 and the adjusting screw 39, and the fingers are adapted to move upwardly or release when an excessive pressure exists in the press box and thus prevent injury to the fingers or to the parts associated therewith. The nut 37 may be adjusted to regulate the tension of the spring 36. It will be apparent from an inspection of Figure 5 of the drawings that the spring 36 exerts an outward pull on the eye-bolt 34 and through the links 19 and 27, tends to move the shaft 6 in a clockwise direction. As the fingers 8 and 13 move with the shaft, they are adapted to move downwardly to an operative position. When the pressure in the press box exceeds the force exerted by the spring, the fingers are moved upwardly, revolving the shaft in the opposite direction and exerts an inward pull on the eye-bolt 34. As soon as the pressure in the press box falls below the force exerted by the spring the spring will again move the fingers to an operative position.

When the press door is lowered to the position shown in Figure 6 of the drawings, the weight of the housing 22 tends to retain it in a vertical position and it moves away from the press box door, as indicated in dotted lines in Figure 5 of the drawings and as shown in full lines in Figure 6 of the drawings. The housing 22, being connected to the retaining finger by the links 19 and 27 and the spring 36, causes the retaining finger and shaft to revolve when the press box door is lowered and thus causing the retaining finger to assume the dotted line position shown in Figure 5 of the drawings. It will thus be apparent that the retaining fingers will be in an inoperative position and permit ready removal of the bale from the press box.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. In a device of the character described, a shaft, a retaining finger mounted on said shaft, links pivotally connected to said retaining finger, a housing arranged over said links, a bolt secured to said links and extending through said housing, and a spring surrounding said bolt, one end of said spring engaging said housing.

2. The combination with a press box door of a cotton press, of a shaft rotatably mounted thereon, a finger keyed to said shaft and normally projecting into the press, a depending member loosely mounted on said shaft and connected to said finger, and a hinge supporting said door whereby movement of said door to an open position will cause relative rotation of said shaft and move said finger to an inoperative position.

3. In a device of the character described, a shaft, a retaining finger mounted on said shaft, said finger being adapted to extend transversely into and partially across a press box through the door thereof, and means for exerting a constant force on said finger in one direction.

4. The combination with a press box, of a pivotally mounted finger normally extending transversely into the press box, and yielding means for holding said finger in normal position, said finger being adapted to assume a position substantially parallel to a wall of the press box.

In testimony whereof, I affix my signature in presence of two witnesses.

EDDIE C. CAMERON.

Witnesses:
HORACE BRADLEY,
J. A. SINGER.